(12) United States Patent
Meier

(10) Patent No.: US 7,131,139 B1
(45) Date of Patent: Oct. 31, 2006

(54) METHOD FOR AUTHORIZING ACCESS TO COMPUTER APPLICATIONS

(75) Inventor: Thomas Meier, Bienne (CH)

(73) Assignee: Swatch AG, Biel (CH)

( * ) Notice: Subject to any disclaimer, the term of this patent is extended or adjusted under 35 U.S.C. 154(b) by 660 days.

(21) Appl. No.: 09/664,486

(22) Filed: Sep. 18, 2000

(30) Foreign Application Priority Data

Sep. 28, 1999 (CH) .................................... 1768/99

(51) Int. Cl.
*H04L 9/32* (2006.01)
(52) U.S. Cl. ..................... 726/4; 380/258; 455/404.2
(58) Field of Classification Search ................ 713/202, 713/200, 150; 455/53.1, 404.2, 408; 340/825.19, 340/5.8, 5.27, 5.3, 5.7; 400/82; 235/379, 235/380, 382; 368/10; 726/4; 380/255, 380/258

See application file for complete search history.

(56) References Cited

U.S. PATENT DOCUMENTS

| | | | | |
|---|---|---|---|---|
| 4,656,342 A | * | 4/1987 | Ugon | 235/379 |
| 5,153,581 A | * | 10/1992 | Hazard | 340/5.8 |
| 5,537,102 A | * | 7/1996 | Pinnow | 340/5.8 |
| 5,941,648 A | * | 8/1999 | Robinson et al. | 400/82 |
| 6,335,906 B1 | * | 1/2002 | Engelmann | 368/10 |
| 6,694,436 B1 | * | 2/2004 | Audebert | 713/200 |

FOREIGN PATENT DOCUMENTS

| | | |
|---|---|---|
| DE | 197 06 494 A | 8/1998 |
| FR | 2 760 158 A | 8/1998 |

* cited by examiner

*Primary Examiner*—Kim Vu
*Assistant Examiner*—T. B. Truong
(74) *Attorney, Agent, or Firm*—Sughrue Mion,

(57) ABSTRACT

The method for authorizing access to computer applications is implemented using a computer installation which includes a computer station (1) connected to an inter-computer communication network (9), a read unit (10) connected by an electric cable (2) to the station (1), and at least one personalized portable object (7) in communication with the read unit (10) for the transfer of data. The portable object (7), in particular a wristwatch, includes a memory, several positions of which for access words are kept secret by a read and/or write barrier and at least one position of which for a word is readable.

The read unit (10) detects the object (7) close by, reads the readable word and commands the station (1) to connect itself onto a determined server (8) to look in a checking file to see whether the readable word forms part of a list of authorised words. In the affirmative, a password is transmitted to the station (1) so that the read unit (10) sends it to the object (7) to open the read barrier. All the access words are then sent to the station (1) to authorize the opening of the corresponding applications.

16 Claims, 3 Drawing Sheets

Fig. 1

METHOD FOR AUTHORIZING ACCESS TO COMPUTER APPLICATIONS

The present invention concerns a method for authorising access to computer applications using computer equipment which includes a computer station connected to a computer inter-communication network, a read unit in communication with the station, at least one portable object provided with a personalised electronic circuit having first signal transmission and reception means, said electronic circuit having a memory including at least one readable verification word, the read unit having second signal transmission and reception means for communicating with the portable object when the latter is located within a determined zone.

The invention also concerns a read unit for the transfer of data and/or commands with the computer station and an access authorisation device in particular for implementing the method.

As is common at the present time, most of the computer work stations are also connected to communication networks between computers whether locally or world-wide in order to be able to use various applications offered on servers or simply for the transfer of data from one station to another.

The use of a computer or a work station in every area of activity has become a necessity in order to accomplish various daily tasks such as for example drafting texts or establishing tables of data at one's workplace or even in relation to bank accounts.

Since the development of communication means over these last few years, computers can also be connected to communication networks for transmitting or seeking data or messages between computers located at any point on the globe. This set of communication networks has led to the concept of a network of the networks called the Internet in order to allow anyone working at his work station to find multiple data in various servers or the world network. Visual, acoustic or simply textual data can be found.

Certain services offered in the computer can be protected using codes or passwords to be introduced, only allowing access to authorised persons in the event that said interrogated services contain personal or confidential data. These use precautions have led to the development of various security devices in connection with access to the computer.

Passwords to be entered using a computer keyboard were the first means used to prevent any unauthorised person access to personal or confidential computer applications. However, this requires the computer user to know his password at all times, failing which it will be difficult for him to access these applications without calling a computer specialist.

Certain facilities for access to computers for authorised persons consisted for example in providing them with a card or even a personalised watch including transmission and reception means able to interact with a reader integrated in the computer structure using electromagnetic waves. As soon as the card or watch is sufficiently close to the reader, connection to the computer is automatic with no further need to enter a password, in order to simplify the access to the computer applications.

In the case of a wristwatch, storing data in a memory of the watch once the user is wearing it, and deleting it automatically when he removes the watch from his wrist, has even been envisaged as a security measure. The removal of the watch from the wrist prevents it from being used by an unauthorised person to access personal computer applications in the event that the watch is lost or stolen. Each time that the watch has to be used to access the computer, a procedure for storing access codes in the watch memory has to be performed.

European Patent No. 496344 discloses a system allowing a wearer of a wristwatch with an individual access code to be able to be automatically connected to the computer from his work station by moving his watch close to an antenna of a reader of the computer. The watch includes in particular an antenna and signal transmission and reception means for communication with the reader. A power source for the electronic components can be provided in the watch. The electronic components of the reader are integrated in the computer structure, while the external antenna of the reader is connected to the computer by an electric cable. The antenna takes the form of a flat coil housed in a mat for the keyboard.

As soon as the wearer of the watch moves away from the keyboard of the switched on computer, as a security measure, this blocks the keyboard controls and prevents anyone from being able to work with the personal applications of the wearer of the watch according to the given configuration of said computer. Moreover, the entry of an identification code is also envisaged, for example by means of the computer keyboard, at the beginning of the work session in order to prevent anyone being able to use the computer in the event that the watch is lost or stolen.

In the aforecited document, it should be noted that the basic structure of the computer has to be modified so as to be able to house therein certain electronic components of the reader, which is a drawback. Moreover, it has not been suggested that access be automatically given to several personal or confidential applications protected by access codes on any work station connected to a computer inter-communication network. The approach of the watch with its individual access code only gives access authorisation to a work station locally, i.e. a work station forming part of the same network inside the same company. It is thus necessary to remember all said codes to be entered to reach one or other of the selected protected applications.

The object which the invention proposes to achieve is to overcome the aforecited drawbacks and to be able to authorise automatic access to several computer applications with an access code, for example personal or confidential applications, without it being necessary to remember all the codes of each of the selected applications.

This object is achieved as a result of the method for authorising access to computer applications as indicated above, characterised in that it includes the steps of:

a) placing the portable object within the determined zone in order that the reader detects its presence, reads the readable word of the circuit memory and gives the instruction to the station to connect itself automatically to the communication network toward a checking file of a determined server for sending the readable word, b) searching in the checking file to see whether the readable word is included in a list of authorised words, c) only if the readable word has been found in the list, sending from the checking file a password, addressed to storage means to open the read barrier, and d) communicating the access words contained in the storage means to the station in order to authorise said applications to be opened.

This object is also achieved as a result of a peripheral read unit intended to be in communication with a computer station which is characterised in that it includes signal transmission and reception means in order to be able to communicate with a portable object provided with a personalised electronic circuit having other signal transmission and reception means when the latter is located within a determined zone.

This object is also achieved as a result of a device for authorising access to computer applications including a portable object provided with a personalised electronic circuit having first signal transmission and reception means, and a peripheral read unit having second signal transmission and reception means for communicating with the portable object when it is located in a determined zone, the read unit being in communication with a computer station.

One advantage of the method for authorising access to computer applications according to the invention is that it allows any authorised person, even if not initiated in computer techniques, who has a personalised portable object provided with an electronic circuit having signal transmission and reception means for communicating with a read unit, to be easily and simply connected to personal computer applications through a computer work station. The computer station is connected to a computer inter-communication network either locally or world-wide. Further, access codes to the applications are stored in storage means with a read and/or write barrier of a computer installation, and the read unit is in communication with the work station for the mutual transmission of data and/or commands.

Another advantage is that the connection to one's own computer applications can occur at any work station without any particular configuration provided a read unit is connected to one input of said station and that the station is connected to the computer inter-communication network, preferably to a world-wide network. Greater mobility of access is thus offered by using said communication network to be able to look for the readable identification word in a list of authorised words of a checking file belonging to a determined server.

It is thus not necessary to remember all the passwords of the various applications since they are all stored in read and/or write barrier storage means which are, for example, included in the memory of said portable object. The read barrier is open after the readable verification word of the memory of the object has been validated in a predetermined checking file. This thus avoids having to enter them manually using a computer keyboard and subsequently committing entry errors, or looking for the desired application in the computer.

Generally, the addresses of the applications to be opened by access words are mainly in the server interrogated in the communication network, while the corresponding access words are in the memory of the portable object's circuit. It is nonetheless conceivable for the addresses of the applications to also be stored in the memory of the circuit provided that it can contain enough access words and address words.

In the event that the circuit memory only contains the readable verification word or words to be validated by the check file, the application addresses and the corresponding access words can also be in storage means belonging to the predetermined server.

The read unit may be provided directly on any work station preferably so as to form a peripheral unit, but may also be onboard and connected to a standard socket of any work station. The read unit includes a storage module with the address of the predetermined server containing the check file, as well as all the software necessary to give the instruction to the station to which it is connected to connect itself to the predetermined server to the check file of said communication network. When travelling, just the portable object, as well as the read unit may be taken to avoid being burdened with undesirable or large objects.

The fact that the read unit is provided as a peripheral of the work station advantageously avoids having to modify the internal structure of said station. One need only provide the read unit with a suitable electric cable in order to connect it to an input socket of the USB (universal serial bus) type of the work station. From this input, the station supplies the electric power to the read unit and the possibility of data transfer between this unit and the station.

The portable object includes an electronic circuit with a memory in which a readable verification word or access code has been engraved after manufacturing to individualise each portable object. One additional advantage of the invention is that in the event of loss or theft, the portable object can be made inactive by ending its validity via any communication means related to the determined server. It is possible, for example, to establish telephone communication to an artificial voice call centre which is connected to the determined check file to remove the code of the lost or stolen object from the list.

The features of the invention will be explained in more detail in a non limiting manner in the following description based on the drawings, in which.

Figure 1:
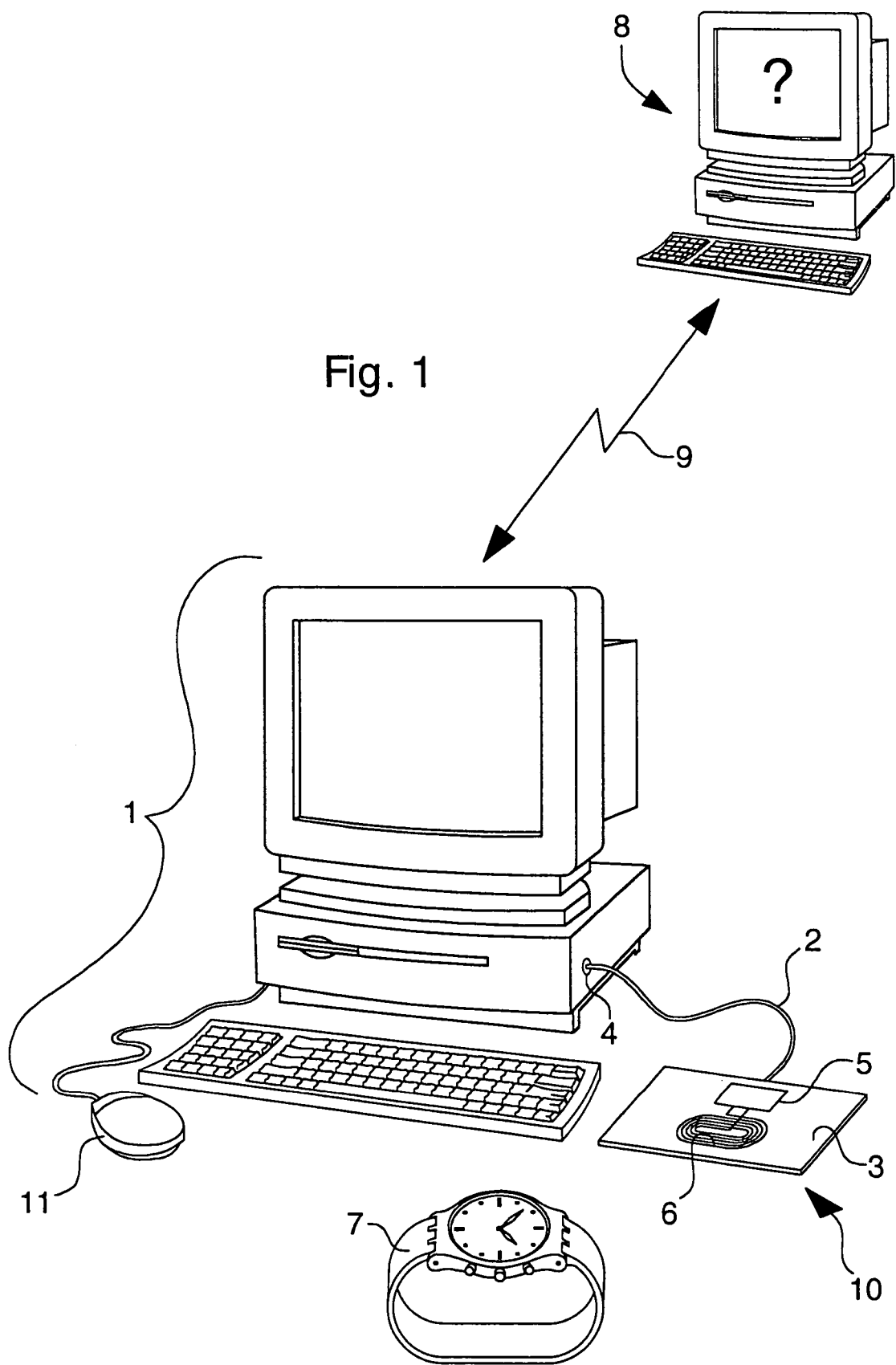
FIG. 1 shows an embodiment of a computer installation with a connection to the world communication network for implementing the method.

The computer installation or access authorisation device, shown in FIG. 1, includes a work station 1 with a keyboard and a screen, a mouse pad 3 in which are integrated all the components of a read unit 10 having magnetic or electromagnetic signal transmission and reception means, in particular for radio-frequency signals, for communicating with a portable object comprising a transponder, represented here by a wristwatch 7. Read unit 10 includes in particular an antenna 6 of planar shape, and a printed circuit 5 with all the electronic control components for the antenna so as to be able to transmit or receive the radio-frequency signals within a determined zone.

Work station 1 is connected to a communication network between computers 9 to be able to be connected to a determined server 8 thanks to an address contained in read unit 10. The communication network is preferably a worldwide network.

Read unit 10 is electrically connected using an electric cable 2 to an input socket 4 of the work station. This socket is of the standard USB (universal serial bus) type. Cable 2 will be used on the one hand to supply read unit 10 with electricity and to allow all the data and/or commands from unit 10 to be transferred to work station 1 and vice versa.

Figure 2:
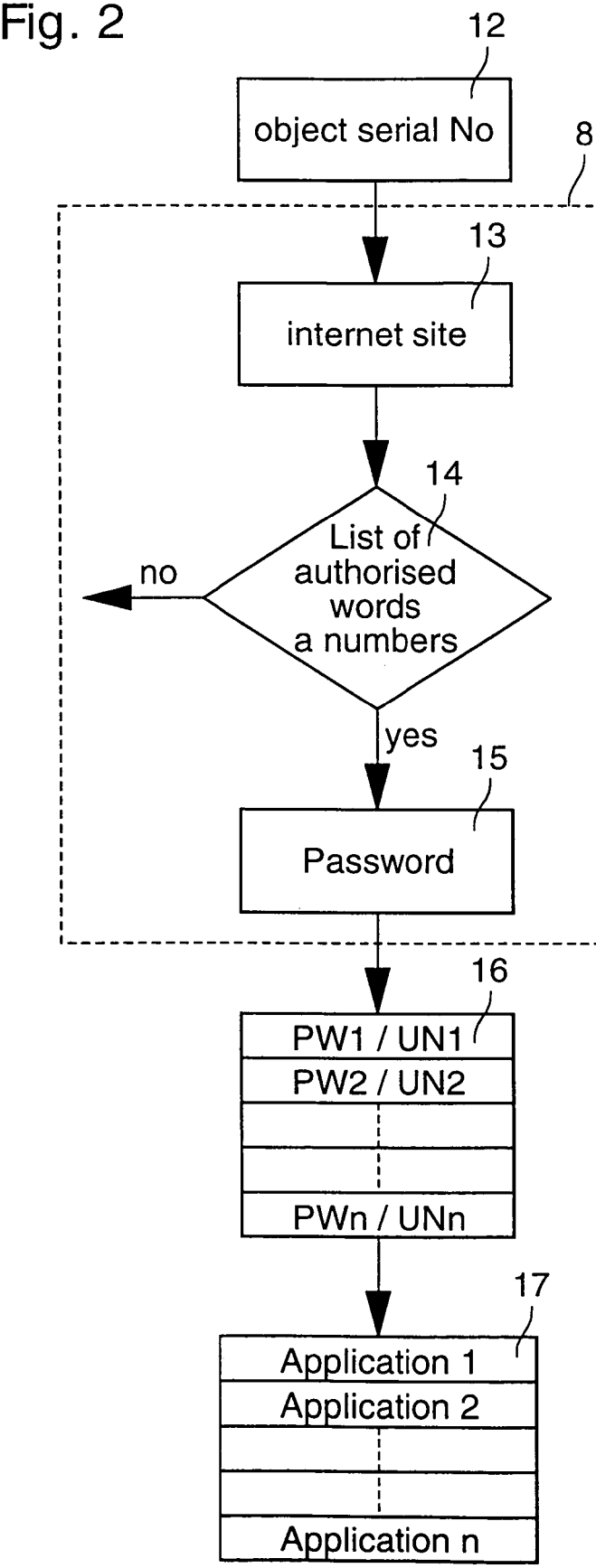
FIG. 2 shows a flow chart of the steps of the method.
Figure 3:
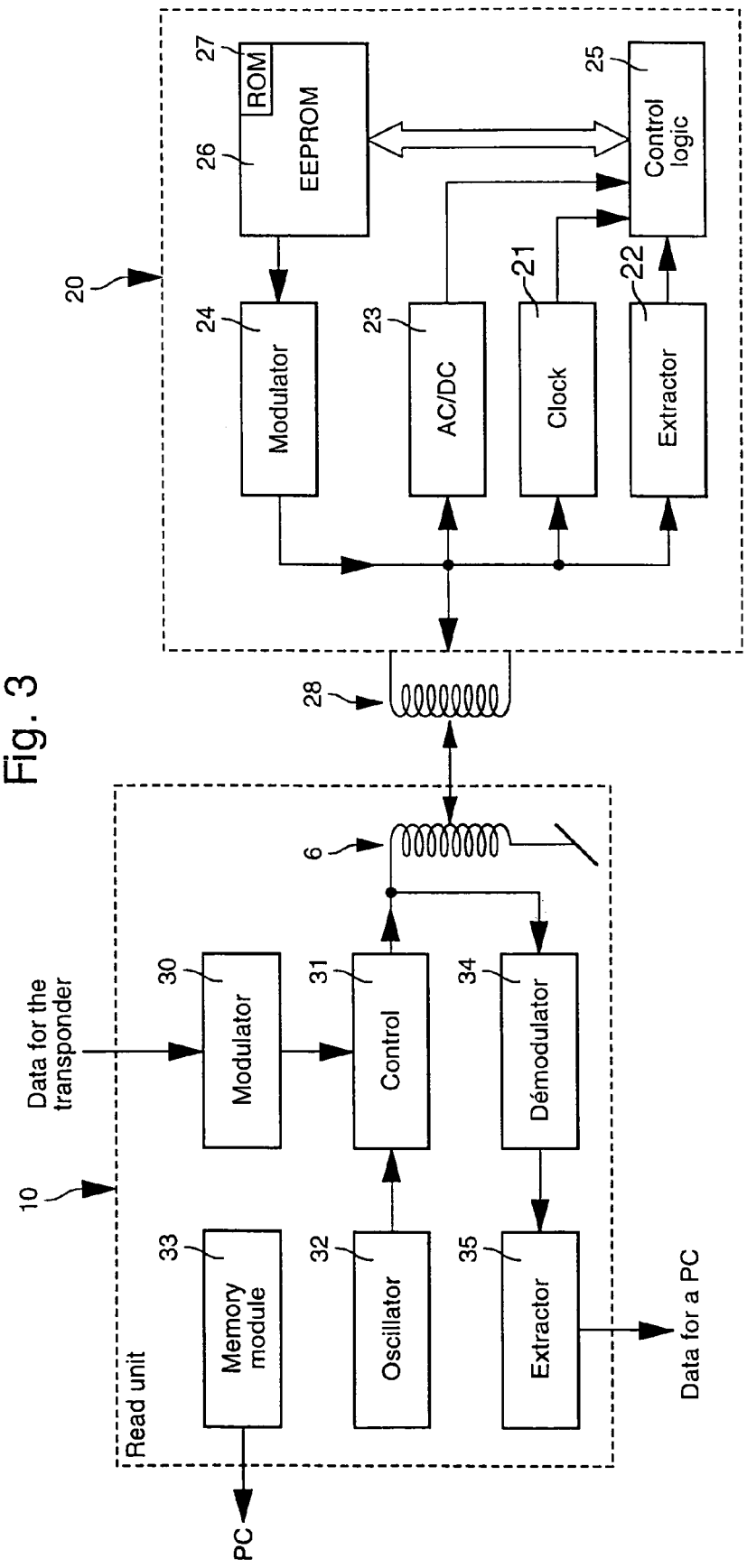
FIG. 3 shows a block diagram of the read unit and the transponder of the portable object.

On printed circuit 5 of read unit 10, visible in FIG. 3, are arranged in particular an oscillator 32 for generating the radio-frequency signals, an amplitude modulator 30 in order to modulate the signals as a function of the data to be sent to the transponder, a control element 31 receiving the signals from modulator 30 and from oscillator 32, a demodulator 34 for the signals received from transponder 20 followed by a filtering and amplification module for said data signals, and a data decoder 35 for transmission to the computer station. The unit also includes a storage module 33 in which an address of the determined server 8 which one wishes to interrogate, such as the server of the watch manufacturer, is stored, as well as address initiation software as will be described in the following description with regard to FIG. 2.

The determined detection zone of read unit 10 depends on the available dimension of antenna 6. Portable object 7 is detected by read unit 10 from a short distance, for example between 2 and 5 cm, so as to force the user to remain very close to the station to open the personal or confidential applications or applications requiring payment with access codes. This precaution of proximity of detection prevents other carriers of portable objects with a transponder in proximity to the read unit disturbing the first user's access.

The computer mouse 11 has been shown in FIG. 1 with an electric connection cable to another computer socket, but it is of course clear that it could be connected differently and that, in order to save on the number of inputs to the computer, the mouse could also be connected to mouse pad 3 and thus use cable 2 to activate the applications appearing on the screen.

Wristwatch 7 worn by a user of the work station contains a transponder 20 so as to be able to communicate data with read unit 10 when it is located within the determined detection zone. The electronic circuit of transponder 20 is for example the circuit V4050/64 manufactured by the company EM Microelectronic-Marin SA.

With reference to FIG. 3, transponder 20 is formed of a coil acting as an antenna 28 connected to an electronic circuit for controlling the signals entering and leaving the transponder. The circuit has a ROM memory portion 27 in which are stored the serial number 12 and the identification code which can be read by the computer. These two words of 32 bits of ROM memory 27 are engraved by laser after said circuit is manufactured so as to personalise each circuit leaving production, and thus cannot be modified.

One portion of EEPROM memory portion 26 of the transponder includes 32 memory positions in which words of 32 bits are stored or will be stored during use with work station 1. These words are passwords and user name words for opening applications of the computer. These words are protected by a read or write barrier. Access to said words is only possible by entering a specific password of the read or write barrier into transponder 20. This specific password cannot be read, but may be modified via work station 1 in communication with portable object 7.

The addresses of the applications corresponding to the access words may also be stored in EEPROM memory 26 provided that there is sufficient space. However, it is more convenient to obtain them from the server which is interrogated.

Electric supply 23 of transponder 20 is drawn from frequency signals comprised for example between 100 and 150 kHz, preferably 125 kHz, transmitted by read unit 10 when portable object 7 is located within the determined zone. This avoids having to supply the object with a power source such as a battery which has to be changed regularly. On receiving the radio-frequency signals from read unit 10, a converter 23 of the circuit rectifies the alternating voltage of coil 28 to supply certain electronic modules of transponder 20 with direct voltage, in particular control logic 25 of the memory. The clock signals 21 are also drawn from the radio-frequency signals to clock to the transponder's operations. It should be noted that the transponder is an additional element to the wristwatch and that there is no relation between the time functions of the watch and the clock signals of the transponder.

An extractor of data 22 received from the read unit is directed towards a control logic module 25 linked to the memory. If the password equivalent to that of the read barrier of the memory is entered into transponder 20, the memory position words are encoded and modulated in a modulator 24 so that they are all transmitted via coil 28 towards read unit 10.

It should be noted that the amplitude modulation used for transmitting the radio-frequency signals both of transponder 20 and read unit 10 are used to define logic states 1 and 0 to decrypt the data sent after decoding.

Instead of radio-frequency signals, high frequency signals (433 MHz) could also be used for the transmission of data and/or commands between the read unit and the portable object.

The method for authorising access to the applications is described schematically below with reference to FIG. 2.

The portable object, which in the present case, is a wristwatch 7 comprising a personalised transponder 20, is moved towards read unit 10 until it is within a determined detection zone. Work station 1 to which read unit 10 is connected must be switched on in order in particular to be able to power read unit 10 so that it transmits detection signals of portable object 7. From this moment, read unit 10, which regularly transmits interrogation radio-frequency signals, detects the presence of watch 7, since it receives a response from the interrogated transponder 20. After interrogation, transponder 20 sends a signal including the readable verification word, i.e. at least the serial number 12 recorded in ROM memory portion 27 to the unit which reads said serial number of the circuit of transponder 20 and gives the instruction to work station 1 to connect itself on determined server 8 to check file 13. Server 8 is for example the server of the watch manufacturer. The address of the server with the check file is contained in a memory of the unit, as well as initiation software for this address.

Once the connection established by Internet to check file 13, called Internet site in FIG. 2, a serial number search for watch 7 is carried out in a list of authorised words or numbers 14 of check file 13. Only when the serial number forms part of this list called the white list, a password 15 is sent by server 8 in the direction of the start station. Read unit 10 receives this word which it communicates to transponder 20.

A check is carried out in the circuit of transponder 20 to find out whether the password received corresponds to the password of the read barrier of EEPROM memory 26. In the affirmative, the read barrier is opened and access words 16, which were kept secret until then in EEPROM memory 26, are all transmitted to work station 1 in order to allow the corresponding applications 17 received in particular via the Internet, to be opened.

Links or icons for each application appear on the station screen, while the access words, i.e. the passwords and the user name words, for opening said applications obtained from EEPROM memory 26, are invisible on the screen, but are intimately linked to each of the selected applications with an access code. The addresses of said applications are provided in particular by server 8. When an icon or link of the application which one wishes to open is activated with computer mouse 11, the passwords and user name are automatically sent to open the application.

The applications, whose address is provided by server 8, correspond to the order of storage of the access words of the memory of transponder 20 of watch 7.

In the event that the memory of transponder 20 is sufficient, the addresses of the selected applications may also be stored in said memory instead of having them from server 8.

The advantage of using access codes for computer applications is justified in the event that, for example, messages of a confidential or personal nature are sent by electronic mail, or a bank account is interrogated from a distance. Access codes can also be stored to give access to game programmes or a provider of communication services such as Netscape®, or to other applications, such as data bases.

The user thus has no need to remember all the access codes of the applications which he wishes to open, since watch 7 with its transponder 20 constitutes a manual with all the access codes stored. If conversely, for one reason or another, said user wishes to change the password, and sometimes even the user name to open such or such an application, he may, with the aid of work station 1, perform all these changes which are then transferred in the direction of transponder 20 in order for the portion of EEPROM memory 26 concerned to be able to store them replacing the previous ones. The write barrier must thus be opened using a specific password, originating from work station 1 and from read unit 10, in transponder 20 for modifying said access codes.

It should be noted that this change of access codes can only occur after having passed all the access authorisation steps.

During the validation procedure of portable object 7, and before the read barrier is opened, it is possible for watch 7 to be moved away from read unit 10. Password 15 sent by server 8 remains on standby in original computer station 1 or in read unit 10 until watch 7 is again moved towards read unit 10. Password 15 is then transmitted to watch 7 to open the read barrier and to give station 1 all the access words which are indispensable for opening each application.

In the event that watch 7 is lost or stolen, the serial number of the circuit may be invalidated by any communication means which is related to check file 13 and its data base. By communicating the serial number, as well as a verification number which only the true owner of lost or stolen watch 7 knows, the serial number of this watch 7 is placed on a blacklist of unauthorised words or numbers. If during the validation procedure, the serial number of watch 7 is sent to determined server 8 in check file 13, the number will not be recognised as a valid number in list 14 and consequently no password 15 will be sent in the direction of watch 7 via computer station 1.

One way of invalidating lost or stolen watch 7 may consist in calling a call centre where an artificial voice asks first of all for the serial number of the watch and then the verification number of said watch. Once these numbers have been entered, an instruction is given to place the serial number on the blacklist of unauthorised numbers, in order to prohibit anyone using the applications of the owner of watch 7 without authorisation.

In the access authorisation method described above, only the serial number was taken into account to validate watch 7, but it would also have been conceivable for several readable words of the memory of transponder 20 to have been sent to server 8. A calculation, using a suitable algorithm and words transmitted in check file 13, is first of all performed to find two specific verification words which will be stored on their return in transponder 20 of watch 7 to occupy two readable memory positions. After the calculation, if one of said words is found in authorised word list 14, password 15 is transmitted to watch 7.

The description which has just been made is in no way limiting. Any embodiment of the computer installation can be conceived for implementing the method for authorising access to computer applications with a work station 1 connected to a communication network 9 between computers, whether locally for example in a Lan or intranet network or world-wide, for example with the Internet.

Read unit 10 may be completely or partially integrated in a different element to mouse pad 3, for example in a computer keyboard. One portion of the read unit may also be enclosed in a case connected by an electric cable 2 or by an optical fibre to a corresponding socket 4 of the work station, antenna 6 of read unit 10 or any other means for communicating with portable object 7 are provided outside the case.

Portable object 7 may take the form of a ring, a bracelet, a badge, a credit card or a necklace provided that it can contain the electronic circuit with the signal transmission and reception means for communicating with the read unit.

The transmission and reception means are designed as a function of the types of communication signals between portable object 7 and read unit 10. The signals may also be optical signals or acoustic signals instead of magnetic or electromagnetic signals.

What is claimed is:

1. A method for authorizing access to computer applications using a computer installation which includes a computer station connected to an inter-computer communication network, a peripheral read unit connected to the computer station for the supply of electric power and for the mutual transfer of data and/or commands, and at least one portable object, which is a watch or a bracelet or a necklace or a ring or a card or a badge, said portable object being provided with a personalized electronic circuit which includes first signal transmission and reception means and a memory which includes at least one readable verification word, the read unit having second signal transmission and reception means for communicating with the portable object when the latter is located within a determined detection zone of the read unit, wherein the method includes the steps of:

a) placing the portable object within the determined detection zone of the read unit so that the peripheral read unit, which includes an antenna of said second signal transmission and reception means, and a printed circuit with all electronic components for controlling said antenna, detects its presence, and reads via the first and second signal transmission and reception means the readable verification word of the memory of the electronic circuit, b) giving the instruction from the peripheral read unit, which contains the address of the determined server in the storage module, as well as address initiation software, to the computer station to connect itself automatically to the communication network for sending the readable verification word toward a checking file of a determined remote server in the communication network, c) searching in the checking file of the determined remote server to see whether the readable verification word is included in a list of authorized words, d) only if the readable verification word has been found in the list, sending from the checking file of the determined remote server a password towards the computer station and the read unit, and via the first and second transmission and reception means to a control logic module of the electronic circuit of the portable object, which shapes said password for opening a read and/or write barrier of storage means, which are contained into the memory of said personalized electronic circuit, in which access words to computer applications are kept secret by the read and/or write barrier, and e) communicating via said first and second transmission and reception means the access words contained in the storage means of the electronic circuit memory of the portable object to the computer station in order to authorize said computer applications to be opened.

2. A method according to claim 1, wherein the addresses of the computer applications to be opened using access words are contained in the storage means.

3. A method according to claim 1, wherein the addresses of the computer applications to be opened using access words are provided to the computer station by the server on the communication network.

4. A method according to claim 1, wherein the link between the computer station and the read unit is assured by an electric cable or an optical fibre, secured to the read unit and able to be connected to a corresponding input socket of the station for the electric power supply of the read unit and the transfer of data and/or commands between the unit and the station.

5. A method according to claim 1, wherein the communication signals between the read unit and the portable object are magnetic or electromagnetic or optical or acoustic signals.

6. A method according to claim 5, wherein the electronic circuit with the first transmission and reception means is a transponder having a coil for receiving and transmitting radio-frequency signals for communicating with the read unit.

7. A method according to claim 6, wherein the electric power supply of the transponder is provided using the radio-frequency signals received from the read unit.

8. A method according to claim 6, wherein the radio-frequency signals are amplitude modulated for the transmission of data and/or commands.

9. A method according to claim 4, wherein the read unit is entirely integrated in a mouse pad or a keyboard of the computer station.

10. A method according to claim 4, wherein at least a portion of the read unit is integrated in a peripheral case to the work station, the electric cable or the optical fibre being secured to said case.

11. A method according to claim 10, wherein an antenna of the second transmission and reception means of the read unit is integrated in a mouse pad or in a keyboard of the computer station connected to the peripheral case.

12. A method according to claim 1, wherein the memory of the electronic circuit includes several readable words which are sent to the checking file, and wherein in step b), two additional verification words are calculated using an algorithm in the checking file, one of said words being searched in the checking file in order to know whether it is authorised, said additional verification words being stored on their return in the electronic circuit of the portable object in the readable portion of the memory.

13. A peripheral read unit intended to be in communication with a computer station, for implementing the method according to claim 1, said read unit comprises:
   signal transmission and reception means having an antenna in order to be able to communicate with a portable object provided with a personalized electronic circuit having other signal transmission and reception means when the latter is located within a determined detection zone of the read unit, and
   a printed circuit comprising all electronic components for controlling said antenna and a storage module storing the address of the determined server and address initiation software,
   wherein the read unit is completely integrated in a case or in a computer keyboard or in a mouse pad.

14. A device for authorizing access to computer applications, for implementing the method according to claim 1, including a portable object, which is a wristwatch provided with a personalized electronic circuit, which is a personalized transponder having first signal transmission and reception means, and a peripheral read unit having second signal transmission and reception means for communicating with the portable object when the latter is located within a determined detection zone of the read unit, the read unit being in communication with a computer station, wherein the peripheral read unit comprises an antenna of said second signal transmission and reception means, and a printed circuit with all electronic components for controlling said antenna and with a storage module storing the address of the determined server and address initiation software, and wherein the peripheral read unit is connected by an electric cable or an optical fibre to a corresponding input socket of the computer station for the electric power supply and the transfer of data and/or commands between the read unit and the station.

15. A method for authorising access to computer applications using a computer installation which includes a computer station connected to an inter-computer communication network, a read unit in communication with the computer station, and at least one portable object, which is a watch or a bracelet or a necklace or a ring or a card or a badge, said portable object being provided with a personalised electronic circuit which includes first signal transmission and reception means and a memory which includes at least one readable verification word, the read unit having second signal transmission and reception means for communicating with the portable object when the latter is located within a determined detection zone of the read unit, wherein the method includes the steps of:
   a) placing the portable object within the determined detection zone of the read unit which contains the address of a determined remote server in a storage module, as well as address initiation software so that the read unit detects its presence, reads via the first and second signal transmission and reception means the readable verification word of the memory of the electronic circuit, and gives the instruction to the computer station to connect itself automatically to the communication network for sending the readable verification word toward a checking file of a determined remote server in the communication network,
   b) searching in the checking file of the determined remote server to see whether the readable verification word is included in a list of authorised words,
   c) only if the readable verification word has been found in the list, sending from the checking file of the determined server a password towards the computer station and the read unit, and via the first and second transmission and reception means to storage means, in which access words to computer applications are kept secret by a read and/or write barrier, said password being addressed to storage means to open the read and/or write barrier, and
   d) communicating via said first and second transmission and reception means the access words contained in the storage means to the computer station in order to authorise said computer applications to be opened.

16. A method according to claim 15, wherein the storage means for the access words to the applications are included in the memory of the electronic circuit of the portable object or in the determined server.

* * * * *